United States Patent
Lisitsa et al.

(10) Patent No.: US 7,290,039 B1
(45) Date of Patent: Oct. 30, 2007

(54) INTENT BASED PROCESSING

(75) Inventors: Rafael S Lisitsa, Bellevue, WA (US); Dale A Sather, Seattle, WA (US); Costin Hagiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 09/794,799

(22) Filed: Feb. 27, 2001

(51) Int. Cl.
*G06F 15/16* (2006.01)

(52) U.S. Cl. ............... 709/217; 709/209; 709/212; 709/200

(58) Field of Classification Search ........... 709/209, 709/212, 216, 218, 249
See application file for complete search history.

(56) References Cited

U.S. PATENT DOCUMENTS

| | | | |
|---|---|---|---|
| 5,887,139 A * | 3/1999 | Madison et al. | 709/223 |
| 5,940,771 A * | 8/1999 | Gollnick et al. | 455/517 |
| 6,229,525 B1 * | 5/2001 | Alexander | 345/157 |
| 6,266,640 B1 * | 7/2001 | Fromm | 704/273 |
| 6,363,434 B1 * | 3/2002 | Eytchison | 719/313 |
| 2002/0034280 A1 * | 3/2002 | Infosino | 379/88.02 |
| 2002/0124082 A1 * | 9/2002 | San Andres et al. | 709/225 |

OTHER PUBLICATIONS

U.S. Appl. No. 09/650,481, filed Aug. 29, 2000, Wong et al.

* cited by examiner

*Primary Examiner*—Kenny Lin
(74) *Attorney, Agent, or Firm*—Amin, Turocy & Calvin, LLP (57) ABSTRACT

Presented is a system and method for determining a user's intent. Specifically, constituents and a topology are derived from the user's expression of intent, which can be stated broadly or stated in specific detail. The intent is expressed verbally, written, or in an XML format. The constituents and topology are resolved into a configuration based upon contexts. The contexts, which include a resource context, a user context, and an application context, includes information about the user's preferences, location, restrictions, device and network availability, and content availability. The configuration is then implemented.

19 Claims, 4 Drawing Sheets

INTENT BASED PROCESSING

TECHNICAL FIELD

This invention relates generally to electronic data processing and, more particularly, relates to a system and method for selecting and configuring network components based on user intent.

BACKGROUND OF THE INVENTION

The processing capability of computer components is continually increasing. The industry has responded by creating applications and operating systems that take full advantage of these performance enhancements. However, as additional functionality was added, these applications generally became more complex, requiring the user to become increasingly knowledgeable about the applications and operating systems to be able to take full advantage of the enhancements.

In response to user aggravation, industry created simpler interfaces that are easier to use so that the average user did not have to be as knowledgeable about the application and the operating system. For example, commonly assigned patent application Ser. No. 09/650,481, "System and Method for Identifying Audio/Visual Programs to be Recorded," filed Aug. 29, 2000, provides for a token schema that provides sufficient program criteria to enable a recording system that receives the token to record the identified program based on the token. The token provides the user with the capability to record a program without having to know the broadcast time for the program or the broadcast channel.

However, while these simpler interfaces significantly enhance the user's experience, the user must still know what program to use and, in many cases, how the program works in order to use the program. A method is needed whereby a program or operating system component can select and configure network components based on user intent.

SUMMARY OF THE INVENTION

The present invention relates to a method for determining a user's intent based on the user's input. The input can be received in a variety of different ways, including verbally. For example, the input can be a simple message, a high level topology request with few, if any, constraints, or a detailed topology request with constraints. Constituents and a topology are derived from the user's intent. The constituents and topology are resolved into a configuration based upon contexts. The contexts provide information about resource availability, preferences, and user authority limitations. The configuration is then realized (i.e., implemented).

Another aspect of the present invention provides an XML schema for facilitating user intent. The XML schema includes an object element that specifies an object to be created, a node element that identifies a node in the desired topology, a connection element to specify connections between nodes, an interface element to specify an interface that clients use to control the object, and a format element that specifies a format for a connection or node.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, broad-cast enabled computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
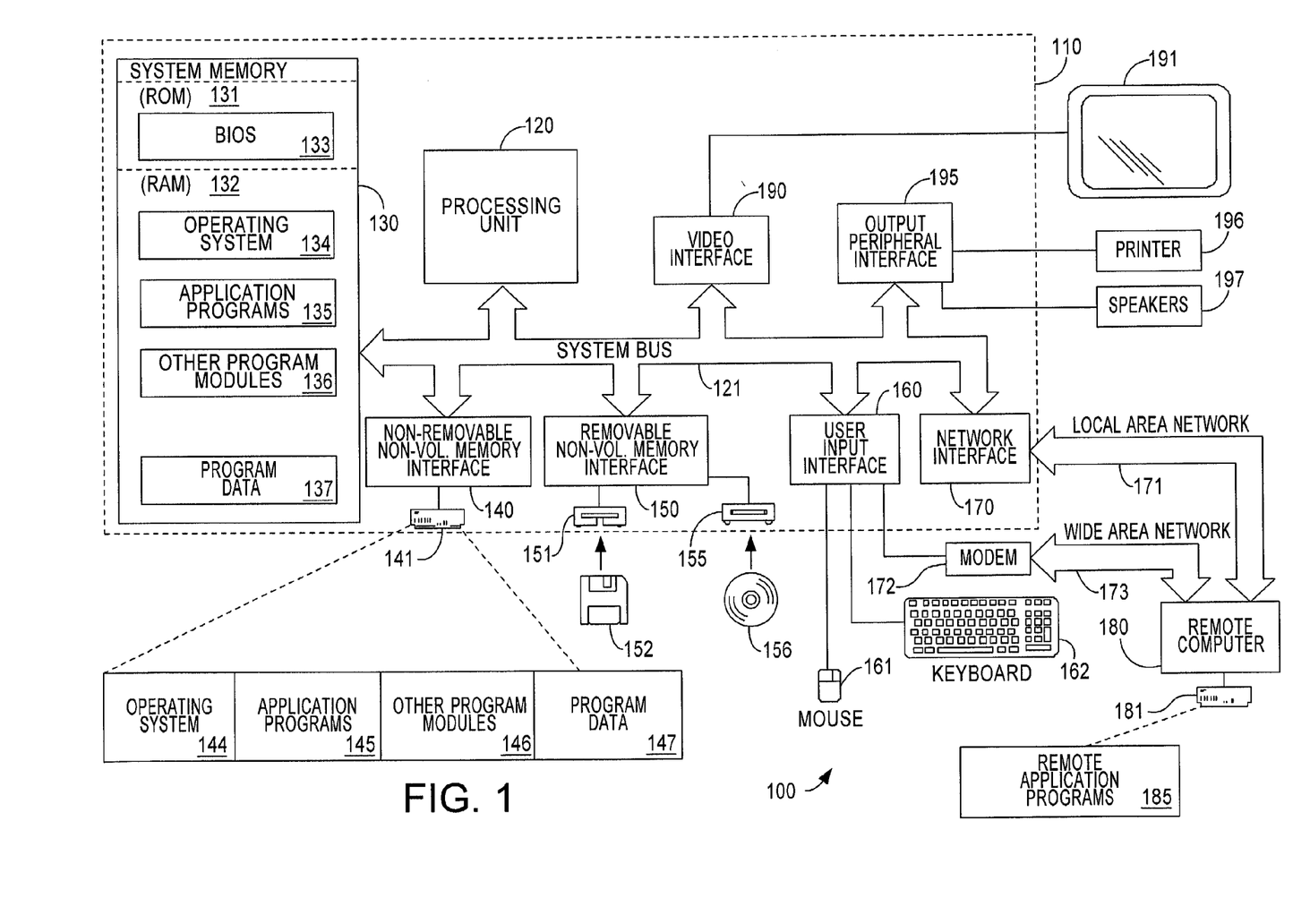
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
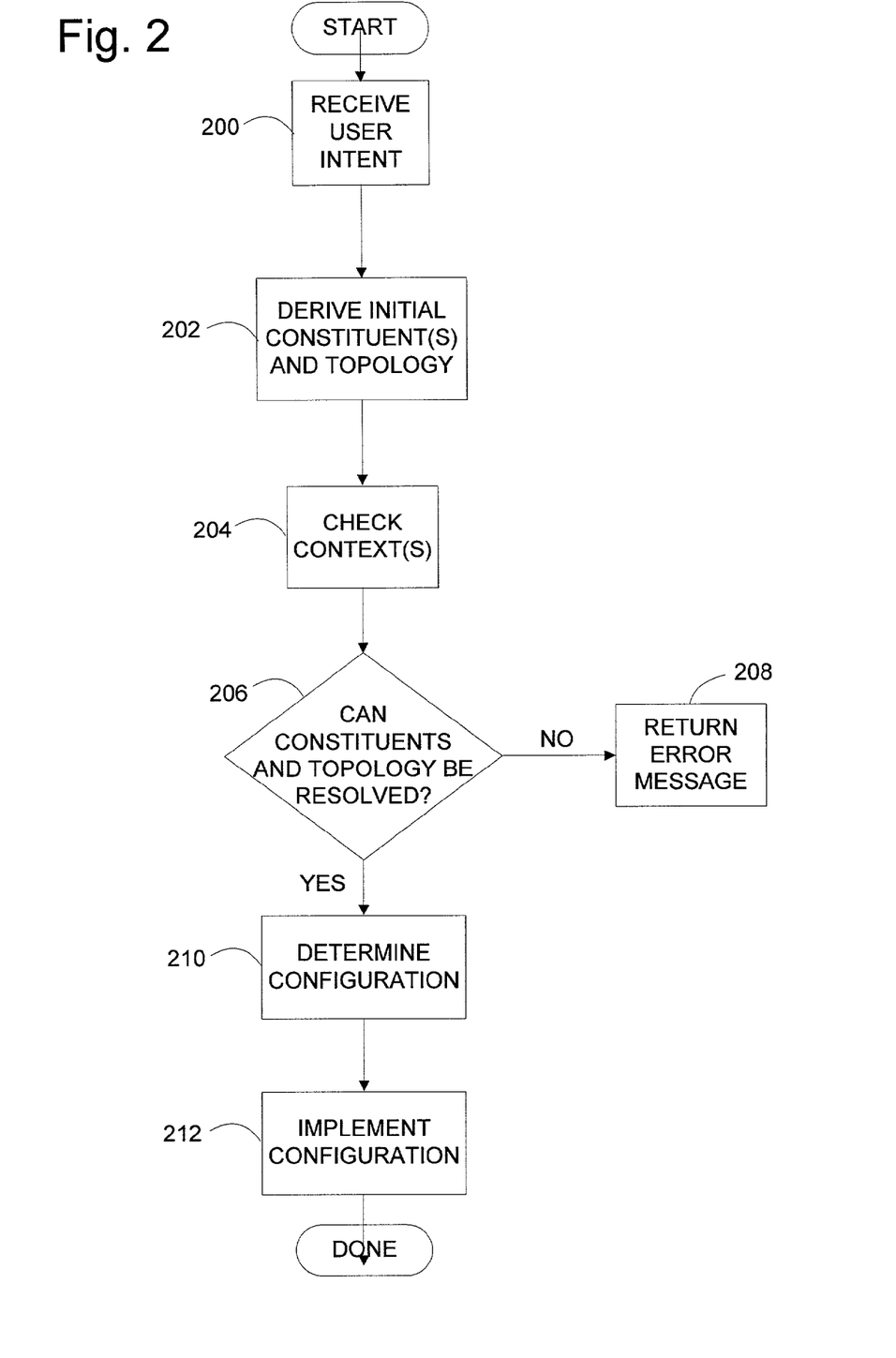
FIG. 2 is a flow diagram for illustrating a methodology for determining a user's intent in accordance with the present invention.

Turning now to FIG. 2, a methodology that program module 136 implements in accordance with the present invention is illustrated. Those skilled in the art will recognize that operating system 134, 144, application programs 135, 145, other program modules 146, remote application programs 185, and computer-readable instructions stored on nonvolatile magnetic disk 152 or nonvolatile optical disk 156 may also be used to implement the methodology.

The process begins with program module 136 receiving the user's intent (step 200). The user's intent is received through the user interface 160 or the network interface 170 and can be submitted verbally or through peripherals like mouse 161, keyboard 162, and modem 172. The user intent can be a simple message like "Play Mozart", a high level topology request with few, if any, constraints, (e.g., "Play Creed in the kitchen") or a detailed topology request with constraints (e.g., "Play 'The Matrix' in the den with the audio going to the surround sound speakers with the volume set at mid-level and the video going to the high definition television at the default streaming rate.").

Program module 136 then determines the constituents and the topology that are in the user intent (step 202). The constituents are the devices and content that is referred to in the intent. The topology is how the constituents are related to each other. For example, the constituents of the user intent expressed as "Play 'The Godfather' on television" are "The Godfather" and the television and the topology is the fact that the user wants to play "The Godfather" on television.

Figure 3:
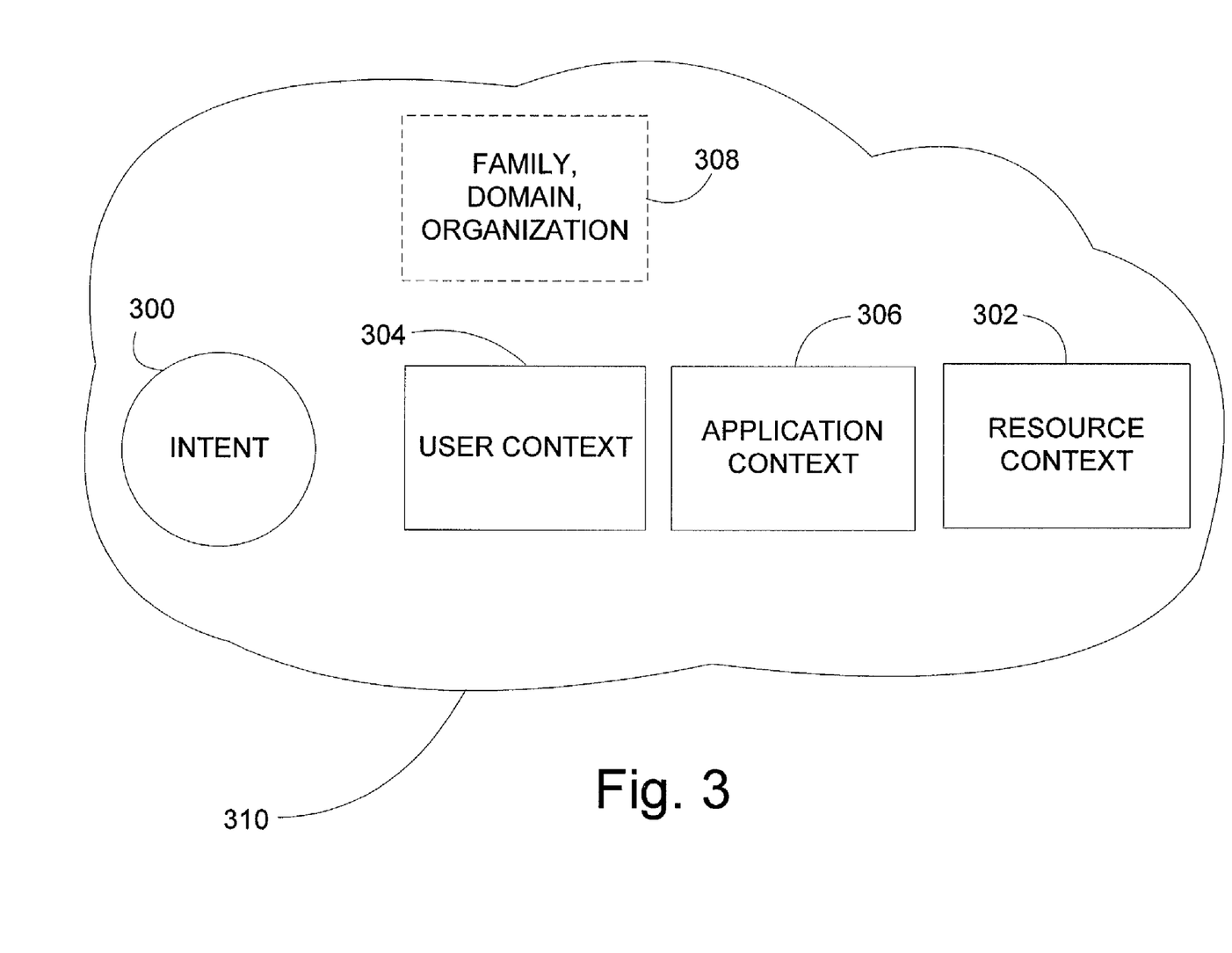
FIG. 3 is a block diagram of exemplary contexts in accordance with the present invention.

The contexts are checked (step 204) for limitations to see if the user's intent can be resolved (step 206). FIG. 3 illustrates how the contexts relate to user intent. In this embodiment, the intent 300 is resolved based upon the resource context 302, the user context 304 and the application context 306. The combination of intent 300 and the contexts 302-306 comprise activity 310. The activity 310 is resolved into a configuration. While user context 304 and application context 306 are shown in FIG. 3, those of skill in the art will recognize that the present invention can be used with just the resource context 302. The present invention can also be used with the resource context 302 and one of the user context 304 and application context 306.

The resource context 302 comprises all the devices and networks and content that are available and how they are available. For example, in a home setting, the resource context 302 would include the computers in the home, the type of network in the home, what is on the computers (e.g., applications and operating systems), networked components (e.g., printers, video recorders, televisions, etc.), where the components are located, whether there is Internet access, and the services available on the Internet.

The user context 304 comprises what is known about the user. For example, the user context 304 includes the user's location, the user's security permissions, the preferences in terms of the services that are used, how to pay for items, and other personal preferences such as how loud music is played. In one embodiment, the user context 304 includes a superset 308. The superset 308 contains information about things the user is part of that is not specific to that user. This information can be information about family, domain, organization, etc. This allows information common to a family (e.g., no M-TV, no R-rated movies before 9 p.m.) to be in one place. Similarly, information common to a domain or an organization can be put in one location.

The application context 306 comprises information about applications that are present. The information includes what type of application an application is, how the application processes inputs, how the application outputs data, etc.

Turning back to FIG. 2, an error message is returned (step 208) when it is determined in step 206 that the user's intent cannot be resolved. For example, the user's intent is to play "The Godfather" on television. The resource context 302 indicates that all of the televisions are presently unavailable (e.g., the televisions are being used or are off-line for repair). As previously indicated, the constituents are the movie and television. The constituents and topology cannot be resolved because one of the constituents is not available. Similarly, if the user context 304 indicates that the user does not have permission to watch the movie, the constituents and topology cannot be resolved and an error message is provided.

If the user's intent can be resolved, a configuration is determined based upon the contexts (step 210) and the configuration is implemented (step 212). A configuration has the characteristics that the providers (e.g., devices, components) for everything are known and the parameters that the providers need to implement the user's intent are known. Using the same example, the user context 304 indicates the user has permission to watch the movie and the resource context 302 indicates that a television is available for use. The configuration is the television and the movie being played on the television and the configuration is implemented by playing the movie on the television. Those skilled in the art will recognize that the intent could result in different configurations based upon the contexts. For example, in a first instance, the television in the den is available and the big-screen television in the basement is unavailable and at another instance, the television in the den is unavailable and the big-screen television is available. In the first instance, the configuration is that the movie is to be played on the television in the den. In the other instance, the configuration is that the movie is to be played on the big-screen television in the basement.

In one embodiment, the users specify their intent through an XML schema. The XML schema allows the users to specify as much detail of what is wanted as the users desire. This can range from a high level topology with few constraints to a detailed description of the topology with detailed descriptions of each component and connection in the topology. The basic elements of the XML schema include an object element, a node element, a connection element, an interface element, and a format element.

The object element specifies an object to be created. The node element identifies a node in the topology and the connection element specifies connections between nodes. The interface element specifies an interface that clients use to control the object and the format element specifies a format for a connection or node. Those skilled in the art will recognize that other elements can be added and that not all elements are needed for certain implementations. For example, there is no connection element if the topology is playing a song that is already loaded on a device on that device.

The object element includes an autoplay attribute. The autoplay attribute indicates whether the object should be started by the component that created the object and provides the user with the ability to specify the object with the object operating until an end command is received.

The node element includes an identifier attribute that identifies the node in the context of the request. This feature allows the node to be referenced by other elements. Child elements, which describe the element in question, describe the user's constraints and goals for the node and indicate what interfaces the user may want to access to control the node.

The connection element includes source and destination attributes that identify the nodes that are to be connected. Additional attributes are a source terminal attribute and a destination terminal attribute. The source terminal attribute and destination terminal attribute are used in situations where a node has multiple connection points (e.g., terminals or pins) and a connection point cannot be identified by the direction of data flow. Child elements are used to specify user constraints and goals including format, quality of service, and routing.

The interface element in the intent schema allows the user to indicate that the interface that is named via the name attribute may be requested in relation to the node to which the interface element is attached. For example, if a user intends to play audio content through a stereo amplifier, she might want to control the volume of the amplifier. An interface element (e.g. <interface>IAudioVolume</interface>) indicates to the program module 136 that the volume interface may be requested and that appropriate resources should be reserved. The interface element results in the advantages that the program module 136 is able to obtain an interface promptly and that the resources required to obtain the interface are reserved.

The format element includes attributes that identify the types of formats the connection or node supports and are used to call out a specific format handler. A format handler is a module that configures a provider to implement a specified format. In the context of a connection, the format of the connection is restricted to the formats specified in the format element. In the context of a node terminal, the formats supported by the node terminal are restricted to the formats specified in the format element.

Figure 4:
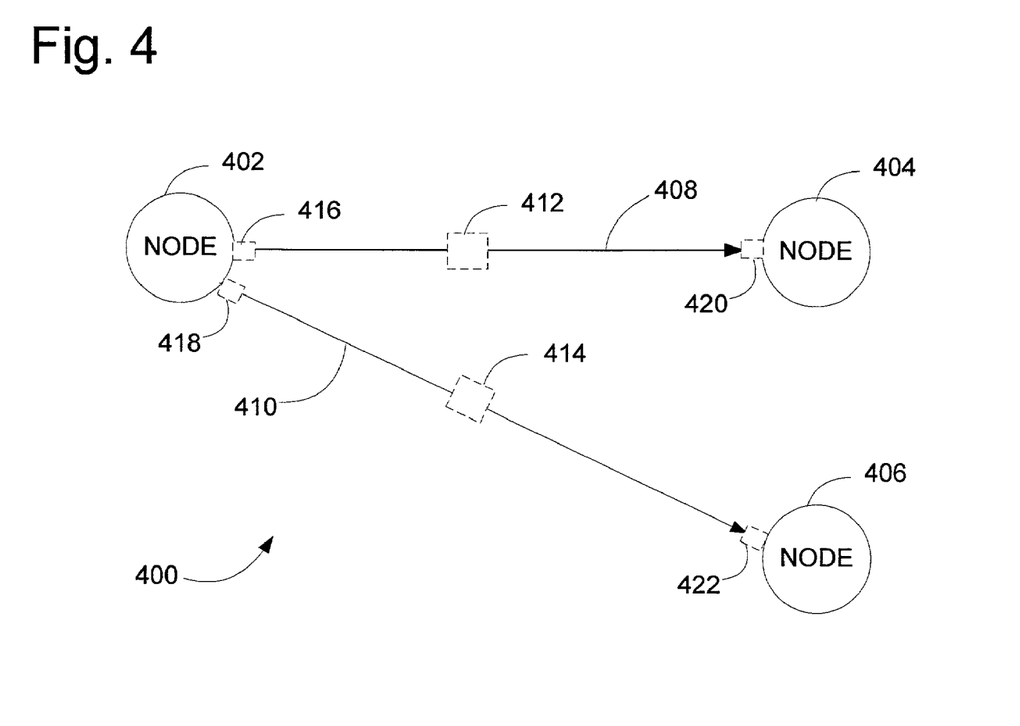
FIG. 4 is a block diagram generally illustrating basic elements of a simple topology.

FIG. 4 illustrates the basic elements of a simple topology. The object 400 described by the object element has nodes 402-406. The nodes 402-406 are identified by the identifier attribute (not shown). The node 402 is connected to nodes 404, 406 by connections 408, 410 which have source node and destination node attributes 412, 414, source terminal attributes 416, 418, and destination terminal attributes 420, 422. The interface element provides a client with a control interface (not shown). The format element (not shown) specifies the formats at the node terminals and connections.

An example of the XML schema to express user intent is below. The user intent is to play audio/video streams from a UPnP camera on a laptop and an IEEE 1394 compatible television. The XML schema is:

```
<streamingObject autoplay="true">
    <node ID="camera">
        <upnpSource address=" . . . ">
    </node>
    <node ID="laptop">
        <abstractDest> default-display <abstractDest/>
    </node>
    <node ID="tv">
        <upnpSource address=" . . . "/>
    </node>
    <connection src="camera" dest="laptop"/>
    <connection src="camera" dest="tv"/>
</streamingObject>
```

In this example, the streaming object is set to automatically run until an end of stream command is received. The node elements call out the camera, laptop and television. The child elements (e.g., <upnpsource address=" . . . "/>) of the node elements describe the node in more detail. The connection elements indicate how the nodes are interconnected.

The resources are described in XML and allow users to specify their intent in more detail or do nothing and use the defaults. In one embodiment, the UPNP camera is expressed as follows.

```
<streamingDevice type="camera">
    <interface name="UpnPCamera1.0">
    <referenced ID="transport61883">
        <transport>
            <61883 channel=" . . . ">
                <1394/>
            </61883>
        </transport>
    </referenced>
    <referenced ID="audioFormat">
        <format major="audio" minor="pcm">
        <representation> Integer </representation>
        <enum>
            <group>
                <bits> 12 </bits>
                <enum>
                    <channels> 2 </channels>
                    <channels> 4 </channels>
                </enum>
            </group>
            <group>
                <bits> 16 </bits>
                <channels> 2 </channels>
            </group>
        </enum>
        <rate> 44100 </rate>
        </format>
    </referenced>
    <referenced ID="videoFormat">
        <format major="video" minor="rgb">
        <width> 320 </width>
        <height> 200 </height>
        <enum>
            <bitsperpixel> 16 </bitsperpixel>
            <bitsperpixel> 24 </bitsperpixel>
        </enum>
```

-continued

```
    <enum>
        <framespersec> 25 </framespersec>
        <framespersec> 30 </framespersec>
    </enum>
    </format>
</referenced>
<referenced ID="cameraNode">
    <node ID="camera" type="camera1234.5">
    <interface name="upnpCamera1.0"/>
    . . .
    </node>
</referenced>
<enum>
    <group>
        <reference ID="transport61883"/>
        <node ID="mic" type="microphone">
        <node ID="outTerminal" type="outTerminal">
            <reference ID="audioFormat">
        </node>
        <connection src="mic" dest="outTerminal"/>
    </group>
    <group>
        <reference ID="transport61883"/>
        <reference ID="cameraNode">
        <node ID="outTerminal" type="outTerminal">
            <reference ID="videoFormat">
        </node>
        <connection src="camera" dest="outTerminal"/>
    </group>
    <group>
        <reference ID="transport61883"/>
        <reference ID="cameraNode">
        <node ID="audioOutTerminal" type="outTerminal">
            <reference ID="audioFormat">
        </node>
        <node ID="videoOutTerminal" type="outTerminal">
            <reference ID="videoFormat">
        </node>
        <connection src="camera" dest="audioOutTerminal"/>
        <connection src="camera" dest="videoOutTerminal"/>
    </group>
    <group>
        <transport>
            <rtp rtcpLevel=" . . . " ipAddress=" . . . "/>
                <1394/>
            </rtp>
        </transport>
        <reference ID="cameraNode">
        <node ID="outTerminal" type="outTerminal">
            <format major="av" minor="mpeg2">
                <profile> main </profile>
                <enum>
                    <level> main </level>
                    <level> high </level>
                </enum>
            </format>
        </node>
        <connection src="camera" dest="outTerminal"/>
    </group>
</enum>
</streamingDevice>
```

The above device description contains referenced elements, reference elements, enum elements, and group elements. Referenced elements contain text that is used in more than one place in the device description. Reference elements call out referenced elements place to avoid duplication. Enum elements contain a list of options from which one option must be selected. Group elements group together multiple aspects that correspond to a single option. The user selects the specific options she wants and accepts the default selection if no option is selected.

A method of determining a user's intent has been described that provides users with the flexibility to express their intent as broadly or as detailed as desired. The flexibility allows the user to utilize programs without having to know which program to use, which programs and other resources are available, and how the programs work. All of the references cited herein, including patent applications are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for determining a user's intent to be implemented in a computer environment, comprising:

receiving an input from the user containing the user's intent;

determining if the received input is a high-level user message to be resolved into one or more constituents and one or more topologies wherein, the constituents are one or more devices or content referred to in the intent and the topologies specify relationships between the constituents;

if the received input is not a high-level user message, determining if the received input is a detailed request comprising one or more of a plurality of constituents and one or more of a plurality of topologies;

determining a resource context based upon devices available for use, networks available for use, and content available for use, and determining the constituent and the topologies based upon the resource context;

upon determining that the received input is a high-level user message, automatically resolving the user intent into the constituents and the topologies that form a configuration of network components based upon at least one of the resource context, a user context or an application context, wherein the resource context, user context and application context provide information comprising resource availability, preferences and user authority limitations; and implementing the configuration of network components based on the user's intent.

2. The method of claim 1 wherein the step of receiving an input from the user comprises receiving a voice indication.

3. The method of claim 1 wherein the step of receiving an input from the user comprises receiving a plurality of elements.

4. The method of claim 3 wherein the step of receiving a plurality of elements comprises the steps of:

receiving an object element;

receiving a node element; and receiving a connection element, the node element and the connection element specifying a topology for the object element.

5. The method of c-tam claim 4 wherein the step of receiving a plurality of elements further comprises the steps of:

receiving an interface element; and receiving a format element.

6. The method of claim 1 further comprising the step of determining the user context and wherein the step of resolving the input into the constituent and the topologies further comprises determining the constituents and the topologies based upon the user context.

7. The method of claim 6 further comprising the step of determining the application context and wherein the step of resolving the input into the constituent and the topologies further comprises determining the constituents and the topologies based upon the application context.

8. A method for determining a user's intent to be implemented in a computer environment, comprising:
   receiving an input from the user containing the user's intent;
   determining if the received input is a high-level user message to be resolved into one or more of a plurality of constituents and one or more topologies wherein, the constituents are one or more devices or content referred to in the intent and the topologies specify relationships between the constituents;
   if the received input is not a high-level user message, determining if the received input is a detailed request comprising one or more of a plurality of constituents and one or more topologies;
   upon determining that the received input is a high-level user message, automatically resolving the high-level user message into the constituents and the topologies that form a configuration of network components based upon at least one of the resource context, a user context or an application context, wherein the resource context, user context and application context provide information comprising resource availability, preferences and user authority limitations; and
   wherein the step of automatically resolving the constituents and the topologies into the configuration of network components comprises the steps of: determining at least one provider; and determining each parameter the provider needs to operate; and
   implementing the configuration of network components based on the user's intent.

9. An interface for enabling a user intent expressed in a user input to be implemented in a computer environment, the interface comprising:
   a first command to specify an object;
   a second command to specify a node element; and
   a third command to specify a connection element between nodes;
   wherein the first command further comprises an autoplay attribute to command the object to run until an end command is encountered;
   wherein the node element and the connection element specify a topology for the object, wherein when the user input is determined to be a high-level message to be resolved into the object, the node element and the topology contexts are checked for limitations to determine if the user's intent can be resolved, and if the user's intent can be resolved, the topology for the object is automatically resolved into a configuration of network components based upon at least one of a resource context, a user context or an application context;
   wherein when the user input is determined to be a detailed topology request including one or more of the object, the node element or the topology the topology of the object is automatically resolved into the configuration of network components based upon at least one of the resource context, the user context, or the application content; and
   wherein the configuration of network components is implemented based on the user's intent.

10. An interface for enabling a user intent expressed in a user input to be implemented in a computer environment, the interface comprising:
    a first command to specify an object;
    a second command to specify a node element; and
    a third command to specify a connection element between nodes
    wherein the node element and the connection element specify a topology for the object;
    wherein when the user input is determined to be a high-level message to be resolved into the object, the node element and the topology, contexts are checked for limitations to determine if the user's intent can be resolved, and if the user's intent can be resolved, the topology for the object is automatically resolved into a configuration of network components based upon at least one of a resource context, a user context or an application context;
    wherein when the user input is determined to be a detailed topology request including one or more of the object, the node element or the topology, the topology of the object is automatically resolved into the configuration of network components based upon at least one of the resource context, the user context, or the application content;
    wherein the third command further comprises a source name attribute to identify a source node and a destination name attribute to identify a destination node; and
    wherein the configuration of network components is implemented based on the user's intent.

11. The interface of claim 10 wherein the third command further comprises a source terminal attribute to identify a source terminal of the source node and a destination terminal attribute to identify a destination terminal of the destination node.

12. The interface of claim 10 further comprising a fourth command to specify an interface element to control the object.

13. The interface of claim 12 further comprising a fifth command to specify at least one format element.

14. The interface of claim 12 wherein the fifth command further comprises at least one format type attribute to call out at least one specific format handler.

15. A computer-readable storage medium having computer executable instructions for performing the steps comprising:
    receiving an input having a user's intent;
    determining if the received input is a high-level user message to be resolved into one or more of a plurality of constituents and one or more topologies wherein, the constituents are one or more devices or content referred to in the intent and the topologies specify relationships between the constituents;
    if the received input is not a high-level user message, determining if the received input is a detailed request comprising one or more of a plurality of constituents and one or more of a plurality of topologies;
    checking contexts for limitations to determine if the user's intent can be resolved; upon determining that the received input is a high-level user message, automatically resolving the user's intent into a configuration of network components based upon at least one of a resource context, a user context or an application context, wherein the resource context, user context and application context provide information comprising resource availability, preferences and user authority limitations;

determining devices that are available for use;

determining networks that are available for use;

determining content that is available for use;

wherein the step of automatically resolving the user's intent into the configuration of network components is based upon the resource context comprising the devices that are available for use, the networks that are available for use, the content that is available for use; and implementing the configuration of network components based on the user's intent.

16. The computer-readable storage medium of claim 15 having further computer executable instructions for performing the steps comprising:

determining a user's preferences; and wherein the step of resolving the user's intent into a configuration is based upon the user's preferences.

17. The computer-readable storage medium of claim 16 having further computer executable instructions for performing the steps comprising:

determining a user's location; and wherein the step of resolving the user's intent into a configuration is based upon the user's location.

18. The computer-readable storage medium of claim 15 wherein the step of resolving the user's intent into a configuration comprises the steps of:

determining providers to implement the user's intent; and determining parameters required by the providers to realize the user's intent.

19. The computer-readable storage medium of claim 15 having further computer executable instructions for performing the step comprising implementing the configuration.

* * * * *